US007748487B2

(12) United States Patent
Urakami

(10) Patent No.: US 7,748,487 B2
(45) Date of Patent: Jul. 6, 2010

(54) DEVICE MOVABLE ALONG BODY SURFACE

(76) Inventor: Fukashi Urakami, Maruyoshi Bldg. 608, 17-24, Konandai 4-chome, Konan-ku, Yokohama-shi, Kanagawa-ken 234-0054 (JP)

( * ) Notice: Subject to any disclaimer, the term of this patent is extended or adjusted under 35 U.S.C. 154(b) by 1139 days.

(21) Appl. No.: 10/535,340

(22) PCT Filed: Nov. 17, 2003

(86) PCT No.: PCT/JP03/14615

§ 371 (c)(1),
(2), (4) Date: Dec. 12, 2005

(87) PCT Pub. No.: WO2004/046713

PCT Pub. Date: Jun. 3, 2004

(65) Prior Publication Data

US 2006/0123934 A1 Jun. 15, 2006

(30) Foreign Application Priority Data

Nov. 18, 2002 (JP) ............................ 2002-333127

(51) Int. Cl.
*B60B 39/00* (2006.01)

(52) U.S. Cl. .......................... 180/164; 180/901; 180/9; 180/9.1; 248/205.9; 248/206.4; 15/320; 15/322; 15/340.1; 15/340.2

(58) Field of Classification Search ................. 180/164, 180/901, 9, 9.1; 248/205.9, 206.4; 114/222; 406/134, 146, 192; 138/104; 15/320, 322, 15/340.1, 340.2
See application file for complete search history.

(56) References Cited

U.S. PATENT DOCUMENTS 5,014,803 A * 5/1991 Urakami ..................... 180/164
(Continued)

FOREIGN PATENT DOCUMENTS

JP 52-141357 10/1977
(Continued)

*Primary Examiner*—Lesley Morris
*Assistant Examiner*—Tashiana Adams
(74) *Attorney, Agent, or Firm*—Kubotera & Associates LLC

(57) ABSTRACT

This invention provides a device capable of covering the surface of an object situated in a gas with a region filled with a liquid and of moving such region, capable of sucking and collecting such liquid from the surface of the object wetted by the liquid and of drying such surface, and is capable of allowing such region to adhere to and crawl along the surface of the subject, while conducting ultrasonic flaw detection or ultrasonic cleaning of the surface of the object.

This invention provides a device comprising a stereoshaped first region having an annular surface A and a stereoshaped second region having an annular surface B wherein the surface A is the boundary surface between the surface of an object and the first region and the surface B is the boundary surface between the surface of an object and the second region, the portion defining the outer boundary of the surface A is provided with an outer seal member, the portion defining the inner boundary of the surface A is provided with an inner seal member, the first region is connected to a gas suction means, the second region is connected to a liquid supply means, the first region is located on the downstream side of the gas surrounding the device, the first region is located on the downstream side of the second region, and the liquid flowing out of the second region reaches the first region and is subsequently transported by suction to the suction means.

15 Claims, 9 Drawing Sheets

U.S. PATENT DOCUMENTS

| | | | | |
|---|---|---|---|---|
| 5,536,199 | A | 7/1996 | Urakami | |
| 5,588,900 | A | 12/1996 | Urakami | |
| 5,592,998 | A | 1/1997 | Urakami | |
| 5,752,577 | A | 5/1998 | Urakami | |
| 6,102,145 | A * | 8/2000 | Fisher | 180/164 |
| 6,964,312 | B2 * | 11/2005 | Maggio | 180/164 |
| 2002/0174510 | A1 * | 11/2002 | Thatcher et al. | 15/363 |
| 2003/0159230 | A1 * | 8/2003 | Oh | 15/320 |

FOREIGN PATENT DOCUMENTS

| | | | |
|---|---|---|---|
| JP | 5-79829 | A | 3/1993 |
| JP | 10-249296 | A | 9/1998 |
| JP | 2002-215242 | A | 7/2002 |
| JP | 2002-276845 | A | 9/2002 |
| WO | WO 02/38435 | A1 | 5/2002 |
| WO | WO 03/082658 | A1 | 10/2003 |

* cited by examiner

DEVICE MOVABLE ALONG BODY SURFACE

TECHNICAL FIELD

This invention concerns a device that adheres to and moves along the surface of an object situated in a gas, such as the atmosphere, such device having a region that contains a liquid, such as water, such liquid-containing region configured so that such liquid is in direct contact with the surface of the object, and having a region, around such liquid-containing region, that contains a gas which is negatively pressured to suck and collect the liquid flowing out of such liquid-containing region.

This invention also concerns a device that adheres to and moves along the surface of an object situated in a gas, such as the atmosphere, such device having a region that contains a liquid, such as water, such liquid-containing region configured so that such liquid is in direct contact with the surface of the object, and having a region, around such liquid-containing area, that contains a gas which is negatively pressured for the purpose of sucking and collecting the liquid that flows out of such liquid-containing region, and such liquid-containing region having a device that emits ultrasonic waves or a device that receives ultrasonic waves or both of such devices, thereby enabling ultrasonic flaw detection or ultrasonic cleaning of the surface of the object.

This invention also concerns a device that adheres to and moves along the surface of a porous object, such as a fiber or porous pavement for better water drainage, such device having a region that contains a liquid, such as water, such liquid-containing region configured so that such liquid is in direct contact with the surface of the object, and having a region, around such liquid-containing region, that contains a gas which is negatively pressured for the purpose of sucking and collecting the liquid that flows out of such liquid-containing region, and such liquid that flows out of such liquid-containing region exfoliating and removing foreign objects, such as dirt, when flowing through numerous voids on the surface of the porous object and being sucked and transported to the gas-containing region, thereby enabling the cleaning of the surface of a porous object.

This invention also concerns a pressure adjustment device comprising an upstream valve chest, a downstream valve chest, a valve opening that connects the upstream valve chest and the downstream valve chest, a valve that opens and closes the valve opening and a valve-operating means that causes the valve to open and close, so configured that the pressure of the region on the downstream side may be adjusted to a certain goal pressure by way of allowing the valve to open or close according to the pressure difference between the actual pressure of the region on the downstream side and the goal pressure.

Prior Art 1

Described below is the first example of prior art related to this invention.

Various devices have been proposed that adhere to and move along the surface of a steel structure, such as the hull of a ship or a gas storage tank, while conducting ultrasonic flaw detection of welded lines on such surface, or that adhere to and move along the surface of a concrete structure, such as a building or a tunnel, while conducting ultrasonic detection of cracks, etc., on such surface. Used for these devices is a method that transmits ultrasonic waves efficiently by supplying water as a contact medium into the gap between an ultrasonic flaw detector (a probe) and the surface of an object while keeping such ultrasonic flaw detector in contact with the surface.

As a means to keep such ultrasonic flaw detector in contact with the surface of an object, such as the wall of a steel structure, while allowing it to move along such surface, a device movable along the surface of an object with such detector mounted thereon is provided with a magnet, thereby causing the device to adhere to the surface being detected for flaws.

These traditional ultrasonic flaw detection devices have the following drawbacks to be solved, however.

In particular, an ultrasonic flaw detection device having a phased array-type ultrasonic flaw detector which has a wide area for emitting ultrasonic waves requires a large quantity of water as a contact medium, and it is difficult to collect the water used for this purpose, resulting in inconveniences stemming from leaving the subject surface in a wet condition, including rusting of the surface.

Moving an ultrasonic flaw detector along the surface while keeping it in contact with the surface for a long time results in the wear and tear and subsequent damage in the contact portion of the ultrasonic flaw detector as well as on the surface of the object itself.

Traditionally, as a means to keep such ultrasonic flaw detector in contact with the surface of an object, such as the wall of a steel structure, while allowing it to move along such surface, a device movable along the surface of an object with such detector mounted thereon is provided with a magnet, thereby causing it to adhere to the surface being detected for flaws. The inconvenience here is that the magnet cannot adhere to the wall of a concrete structure.

Prior Art 2

Described below is the second example of prior art related to this invention.

The surface of a road paved with a porous material for better water drainage starts to accumulate mud and other foreign materials inside voids as time passes, resulting in diminished water draining capability. Removal of mud and other materials clogging the voids is needed once every 5 years, for that reason.

Traditionally used as a means to remove such mud and other materials is to jet high-pressure water on the porous surface. However, because the voids are not straight holes but are of complexly meandering shapes, the high-pressure water does not necessarily reach the foreign materials, resulting in ineffective cleaning. Further, because the recovery of jetted water is inefficient, this means requires a large quantity of water.

Prior Art 3

Described below is the third example of prior art related to this invention.

The traditional means to remove mud and other materials clogging the voids of a porous surface, such as the surface of a road paved with a porous material for better water drainage, using jetting high pressure water for cleaning purposes is not effective, as described above in Prior Art 2. In light of the challenge described in the same section, and to solve such problem, a device that uses ultrasonic waves is proposed as a means to remove mud and other foreign materials clogging the voids on the surface of a road paved with a porous material for better water drainage in the section: Disclosure of the Invention below where the second objective of this invention is described.

Generally used for cleaning a porous surface, such as a carpet, is a vacuum cleaner, however. In this section, therefore, a traditional vacuum cleaner is given as an example of Prior Art 3 and comparison will be made with the present invention below. The present invention described in this section precludes ultrasonic waves as a means of cleaning, but is still more effective than a traditional vacuum cleaner.

A traditional vacuum cleaner uses air as a fluid medium for allowing foreign materials stuck at the voids of a porous surface to float, and be sucked and collected while riding the fluid. As a medium to allow foreign materials to float and be washed away, however, water is approximately 800 times as powerful as air.

DISCLOSURE OF THE INVENTION

The first objective of this invention is to provide a device that moves along the surface of an object while conducting ultrasonic flaw detection having the following purpose and characteristics in order to solve the problems described in Prior Art 1 above: The device does not require a large quantity of water because the water as a contact medium is all recovered, circulated and reused during such ultrasonic flaw detection operation; the device does not leave the surface of an object in a wet condition, but dries it after the ultrasonic flaw detection operation, preventing the rusting of the surface; and the device conducts ultrasonic flaw detection without making an ultrasonic flaw detector contact the surface, preventing the detector from being damaged.

Further, the first objective of this invention is to provide a device that moves along the surface of an object while conducting ultrasonic flaw detection having a region that contains a liquid as a contact medium, such liquid-containing region having the function of adhering to the surface by negative pressure when such region is negative-pressured.

The second objective of this invention is to provide a device that moves along the surface of an object while conducting ultrasonic flaw detection capable of reliably removing foreign materials clogging the voids on the porous surface of an object without requiring a large quantity of water by configuring the device so as to allow water as a medium for transmitting ultrasonic waves to forcibly enter the voids on the surface of the object made of a porous material, such as porous pavement, thereby allowing ultrasonic waves to act on foreign materials inside complexly meandering voids, allowing such foreign materials to exfoliate and float in the water to be pushed and transported through such voids, followed by all such foreign materials and all the water sucked and collected, while the surface of the object wetted during such operation is dried and the water thus collected is recycled after the foreign materials are separated and removed, in order to solve the problems described in Prior Art 2 above.

This invention may also be applied to a cleaning operation of the porous surface of an object made of fiber, such as a carpet, using ultrasonic waves. In such a case, a carpet may be cleaned of dirt stuck on the surface and of foreign materials fallen within the gaps of the fiber by way of the action of the ultrasonic waves without using a detergent which is a material that pollutes the environment, and the dirt and the foreign materials are all sucked and collected together with the water. Further, the surface of the object wetted during the operation is dried and the water collected is recycled after the dirt and foreign materials are separated and removed.

The third objective of this invention is to provide a device that moves along the surface of an object while conducting cleaning using a liquid capable of effectively removing foreign materials clogging the voids on the porous surface of an object by configuring the device so as to allow water as a fluid medium for transporting materials to forcibly enter the voids on the surface of the object made of a porous material, thereby allowing such foreign materials to exfoliate and float in the water to be pushed and transported through such voids, followed by all such foreign materials and all the water sucked and collected, in order to solve the problems described in Prior Art 3 above.

In order to achieve the first, the second and the third objectives of this invention described above, this invention provides a device that moves along the surface of an object situated in a gas, comprising a stereoshaped first region having an annular surface A and a stereoshaped second region situated inside the surface A and having a surface B, wherein the surface A is the boundary surface between the surface of the object and the first region and the surface B is the boundary surface between the surface of the object and the second region, the portion defining the outer boundary of the surface A is provided with an outer seal member, the portion defining the inner boundary of the surface A is provided with an inner seal material, the first region is connected to a gas suction means that sucks a gas from within the first region, the second region is connected to a liquid supply means that supplies a liquid to the second region, the first region is positioned on the downstream side of a gas surrounding the surface of the object, the first region and the second region, and the portion of the liquid supplied to the second region that exceeds the cubic volume of the second region, i.e., the liquid flowing downstream from the second region, reaches the first region and is subsequently transported to the suction means by riding the flow of the gas being sucked out of the first region, as described in Claim 1.

In order to reinforce the function of the device described in Claim 1, this invention also provides a device that moves along the surface of an object described in Claim 1, having a pressure adjustment means that adjusts the pressure of the second region to any designated pressure, as described in Claim 2.

As described in Claim 3, this invention also provides a device that moves along the surface of an object having the pressure adjustment means that adjusts the pressure of the second region to any designated pressure, i.e., a method of obtaining the optimum pressure for each of various applications of this invention, described in Claim 2, such pressure adjustment means comprising an upstream side valve chest connected to a liquid supply pump, a downstream side valve chest connected to the second region, a valve opening connecting the upstream side valve chest and the downstream side valve chest, a valve that opens and closes the valve opening and a valve-operating means that causes the valve to open and close, so configured that the pressure of the second region is adjusted to any designated pressure by way of the valve being opened or closed due to the pressure difference between the actual pressure of the second region and any designated pressure set as the pressure adjustment goal.

As described in Claim 4, this invention also provides a device that moves along the surface of an object having the valve-operating means described in Claim 3, such valve-operating means being so configured, as an examples of the configuration thereof, that, where Fc is the force of the liquid inside the upstream side valve chest that acts on the valve and in the direction of the valve and Fb is the force of the liquid inside the downstream side valve chest that acts on the valve and in the direction of the valve, wherein the configuration of the valve-operating means that opens and closes the valve causes a force of the same strength as Fc and in the opposite direction from Fc to act on the valve, and causes a force Fx in the opposite direction from Fb and corresponding to the goal value of pressure adjustment to act on the valve, the valve opens when Fb<Fx and the valve closes when Fb>Fx.

As described in Claim 5, this invention also provides a device that moves along the surface of an object having the valve-opening means described in Claim 3, such valve-operating means being so configured, as an example of the configuration thereof, that, where Fc is the force of the liquid inside the upstream side valve chest that acts on the valve and in the direction of the valve and Fb is the force of the liquid inside the downstream side valve chest that acts on the valve and in the direction of the valve, wherein the configuration of the valve-operating means that opens and closes the valve causes a force of the same strength as Fc and in the opposite direction from Fc to act on the valve, causes a force Fo attributable to atmospheric pressure or a force Fo attributable to the pressure of a gas surrounding the surface of an object, the first region and the second region to act on the valve and in the opposite direction from Fb, and causes a force Fs of an elastic body, such as a spring, to act on the valve and in the same direction as Fb, the valve opens when Fb+Fs<Fo and the valve closes when Fb+Fs>Fo.

As described in Claim 6, this invention also provides a device that moves along the surface of an object described in Claims 1 through 5 and having a means that emits ultrasonic waves or a means that receives ultrasonic waves or both of the means at the second region for the application to an ultrasonic flaw detection device or an ultrasonic cleaning device.

As described in Claim 7, this invention also provides a device that moves along the surface of an object described in Claims 1 through 5 and having a means that generates cavitation at the second region for the application to an ultrasonic cleaning device.

As described in Claim 8, this invention also provides a device that moves along the surface of an object described in Claims 1 through 7 and having means that measures the quantity of the liquid supplied to the second region Q by unit time, the absolute pressure Pa of the first region and the absolute pressure Pb of the second region for the purpose of measuring the percentage of void, for example, and calculates values that are equivalent to the aggregate volume of voids existing on the surface of an object based on Q, Pa and Pb for the application of the device described in Claims 1 through 7 to a cleaning device, and a device that cleans the surface of a porous object, in particular.

As described in Claim 9, this invention also provides a device that moves along the surface of an object described in Claims 1 through 8 and having a differential pressure control valve between the first region and the second region for the purpose of adjusting the pressure of the first region to any designated pressure and/or for the purpose of sucking and transporting the air in the second region to the first region so configured that the differential pressure control valve opens when the absolute pressure of the second region minus the absolute pressure of the first region exceeds the designated pressure value, allowing the fluid to flow from the second region to the first region, and the differential pressure control valve closes when the absolute pressure of the second region minus the absolute pressure of the first regions returns to the designated pressure value.

As described in Claim 10, this invention also provides a device that moves along the surface of an object described in Claims 1 through 9 and having wheels or link belts for the purpose of allowing the first region and the second region to move along the surface of the object.

As described in Claim 11, this invention also provides a device that moves along the surface of an object described in Claims 1 through 10 wherein, for the purpose of reinforcing the function of maintaining the pressure of each of the first and the second regions at a certain designated pressure, the outer seal member has a self-sealing shape whereby the outer seal member is pressed against the surface of the subject by the pressure of the gas outside the outer seal member, and the inner seal member has a self-sealing shape whereby it is pressed against the surface of the object by the pressure of the liquid in the second region.

As described in Claim 12, this invention also provides a pressure adjustment device as the first example of the pressure adjustment device that adjusts the pressure of the second region of the device of this invention to the optimum pressure, comprising the upstream side valve chest, the downstream side valve chest, the valve opening that connects the upstream side valve chest and the downstream side valve chest, the valve that opens and closes the valve opening and the valve-operating means that causes the valve to open and close so configured that the pressure of the region located downstream is adjusted to the adjustment goal pressure by way of the valve being opened and closed due to the pressure difference between the actual pressure of the region located downstream and the adjustment goal pressure, such valve-operating means being so configured that, where Fc is the force of the fluid inside the upstream side valve chest that acts on the valve and in the direction of the valve and Fb is the force of the fluid inside the downstream side valve chest that acts on the valve and in the direction of the valve, wherein the configuration of the valve-operating means that opens and closes the valve causes a force of the same strength as Fc and in the opposite direction from Fc to act on the valve, and causes a force Fx in the opposite direction from Fb and corresponding to the goal value of pressure adjustment to act on the valve, the valve opens when Fb<Fx and the valve closes when Fb>Fx.

As described in Claim 13, this invention also provides a pressure adjustment device as the second example of the pressure adjustment device that adjusts the pressure of the second region of the device of this invention to the optimum pressure, comprising the upstream side valve chest, the downstream side valve chest, the valve opening that connects the upstream side valve chest and the downstream side valve chest, the valve that opens and closes the valve opening and the valve-operating means that causes the valve to open and close so configured that the pressure of the region located downstream is adjusted to the adjustment goal pressure by way of the valve being opened and closed due to the pressure difference between the actual pressure of the region located downstream and the adjustment goal pressure, such valve-operating means being so configured that, where Fc is the force of the fluid inside the upstream side valve chest that acts on the valve and in the direction of the valve and Fb is the force of the fluid inside the downstream side valve chest that acts on the valve and in the direction of the valve, wherein the configuration of the valve-operating means that opens and closes the valve causes a force of the same strength as Fc and in the opposite direction from Fc to act on the valve, causes a force Fo attributable to the pressure of the fluid in any region to act on the valve and in the opposite direction from Fb, and causes a force Fs of an elastic body, such as a spring, to act on the valve and in the same direction as Fb, the valve opens when Fb+Fs<Fo and the valve closes when Fb+Fs>Fo.

As described in Claim 14, this invention also provides a device that moves along the surface of an object made of a porous material with numerous voids on the surface and has a means that calculates values that are equivalent to the aggregate volume of such voids, as an embodiment example of this invention, comprising a stereoshaped region M that has a surface M wherein the surface M is the boundary surface between the surface of the object and the region M, the portion that defines the outer boundary of the surface M is provided with an outer seal member, the region M is connected to a suction means that sucks fluids, the region N is space consisting of a fluid that surrounds the region M and the entire surface of the object, so configured that the fluid in the region N reaches the region M through the voids and is subsequently transported by suction to the suction means riding the fluid being sucked out of the region M, and further comprising a measurement means that measures the quantity by unit time of the fluid which moves from the region N to the region M through the voids Q, the absolute pressure of the region M Pa and the absolute pressure of the region N Pb and a calculation means that calculates values that are equivalent to the aggregate volume of the voids based on Q, Pa and Pb.

BEST MODE FOR CARRYING OUT THE INVENTION

Figure 1:
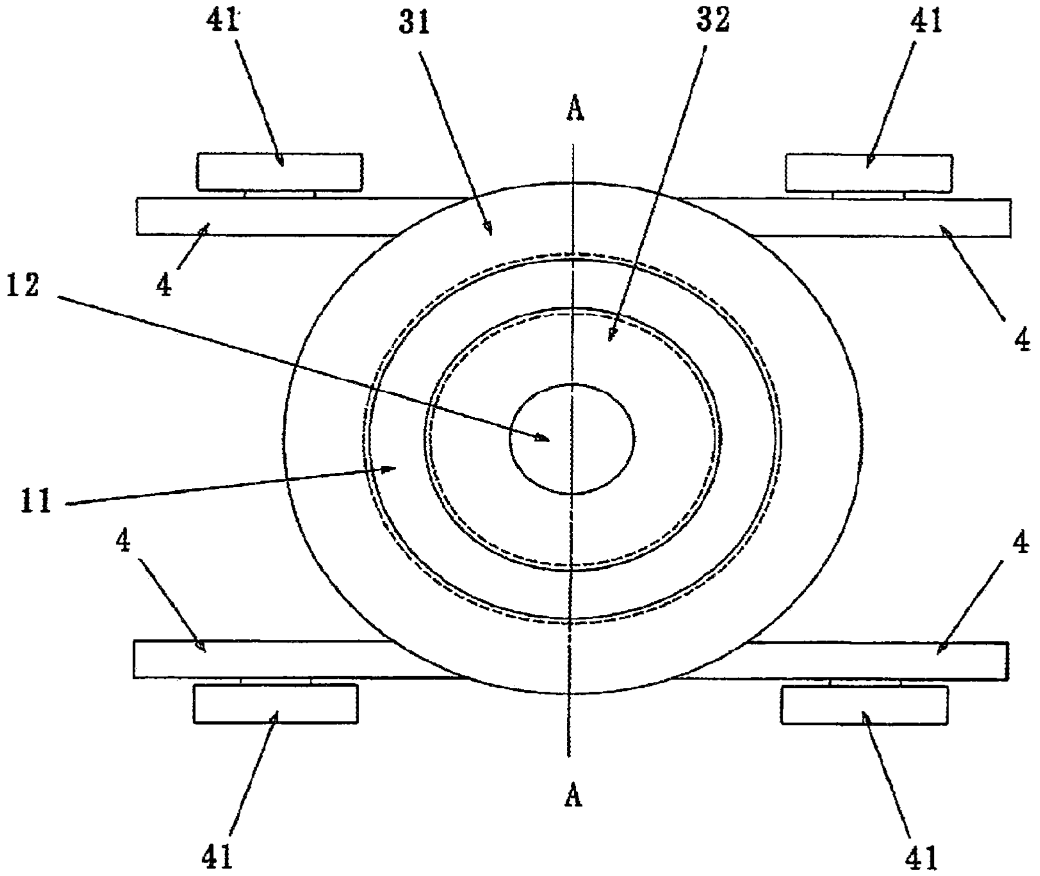
FIG. 1 shows a top view, seen from the direction of the surface of an object, of a preferred embodiment example of the device constructed according to this invention.

A preferred embodiment example of the device constructed according to this invention is described below in further detail by referring to the attached Figures.

In reference to FIG. 1 through FIG. 4, the device illustrated therein has a main casing. The main casing is made of a rigid material and is comprised of a cylindrical partition on the outer periphery 21, and a cylindrical partition on the inner periphery 22 and a disc-shaped partition on the back side 23.

The cylindrical partition on the inner periphery 22 comprises a cylinder that is open where it faces the surface of an object 1 and an annular disc welded to the outer periphery of the opening of the cylinder.

The cylindrical partition on the outer periphery 21 comprises a cylinder that is open where it faces the surface of an object and an annular disc welded to the outer periphery of the opening of the cylinder.

Fixed onto the two sides of the cylindrical partition on the outer periphery is a pair of travelling frames 4 made of a rigid material each having two wheels 41.

Installed with bolts and nuts on the annular disc of the cylindrical partition on the outer periphery 21 is an outer seal member 31 made of a relatively flexible material, such as polyurethane rubber or plastic. The outer seal member 31 has an approximate ring shape with its free end extending along the surface of an object 1 and to the outside of the device. Because of this shape, the outer seal member 31 is pressed against the surface of an object 1 by the pressure of the fluid outside the outer seal member 31. In other words, the outer seal member 31 has a so-called self-sealing shape.

Installed with bolts and nuts on the annular disc of the cylindrical partition on the inner periphery 22 is an inner seal member 32 made of a relatively flexible material, such as polyurethane rubber or plastic. The inner seal member 32 has an approximate ring shape with its free end extending along the surface of an object 1 and to the inside of the device. Because of this shape, the inner seal member 32 is pressed against the surface of an object 1 by the pressure of the fluid inside the inner seal member 32. In other words, the inner seal member 32 has a so-called self-sealing shape.

The cylindrical partition on the outer periphery 21, the cylindrical partition on the inner periphery 22, the outer seal member 31, the inner seal member 32 and the disc-shaped partition on the back side 23, together with the surface of an object 1, define the annular first region 11. The cylindrical partition on the inner periphery 22, the inner seal member 32 and the disc-shaped partition 23, together with the surface of an object 1, define the second region 12.

Installed at the disc-shaped partition on the back side 23 is an ultrasonic flaw detector 91 that emits and receives ultrasonic waves toward and from the surface of an object 1 with water in the second region 12 as a contact medium, or an ultrasonic oscillator 91 that emits ultrasonic waves toward the surface of an object 1 with water in the second region 12 as a transmission medium, conducting ultrasonic wave cleaning of the surface of an object 1.

A coupler 211 welded to the disc-shaped partition on the back side 23 and connected to the first region 11 is connected via hose 961 to the inlet of a cyclone 963 located downstream, and the outlet of the cyclone 963 is further connected via hose 962 to the inlet of a vacuum pump 96. The device of an embodiment example of this invention assumes the maximum suction pressure of the vacuum pump 96 to be approximately 0.35 kgf/cm2 in terms of the absolute pressure. Because pressure loss occurs when a gas is transported by suction through the hose 961, the Pa value of the absolute pressure of the first region: Pa kgf/cm2, is assumed to be approximately 0.62.

Installed at the bottom of the cyclone 963 is a rotary feeder 964 for the purpose of discharging the water collected inside the cyclone 963 to an outside water storage tank 97.

A coupler 221 welded to the disc-shaped partition on the back side 23 and connected to the second region 12 is connected via hose 952 to a coupler 923 of a downstream side valve chest 932 of a pressure control valve 92 located upstream, and a coupler 922 of an upstream side valve chest 931 of the pressure control valve 92 is further connected via hose 951 to a water supply pump of a variable delivery type 95 located further upstream. The device of an embodiment example of this invention assumes the maximum capacity of the water supply pump 95 to be approximately 12 kgf/cm$^2$ in terms of the absolute pressure. Because considerable pressure loss occurs when a liquid is transported through a small-diameter hose 951, the Pc value of the absolute pressure of the upstream side valve chest: Pc kgf/cm$^2$ is assumed to be approximately 4.

Detailed description of pressure control valve 92 is as follows. The casing 921 of the pressure control valve 92 is roughly divided into two chambers: valve storage chamber and valve drive chamber. Inside the valve storage chamber, a disc-shaped valve 927 is caused to descend and close the valve opening 931 of a cm in diameter D, and to ascend and open the valve opening 931 by a drive rod 926. While the valve 927 keeps the valve opening 931 closed, the valve storage chamber is divided into two chests: the upstream side valve chest 931 and the downstream valve chest 932. In the figures of the present embodiment example, the upstream side valve chest 931 and the valve opening 931 are one and the same.

Inside the valve drive chamber, a circular film diaphragm 929 divides the valve drive chamber into two chambers: a pilot pressure chamber 933 and an upstream side pressure chamber 934. While the valve 927 keeps the valve opening 931 closed, the diaphragm 929 keeps a disc-shaped piston 928 of b cm in diameter D pressed down. Fixed onto the disc-shaped piston 928 is the drive rod 926.

Because the coupler 922 of the upstream side valve chest 931 and the coupler 925 of the upstream side pressure chamber 934 are connected by a hose, the pressure of the upstream valve chamber 931 and the pressure of the upstream side pressure chamber 934 are the same. Further, when the diameter D a cm of the valve opening 931 and the diameter D b cm of the piston 928 are the same, the force Fc that pushes the valve 927 upwards to try to open the valve opening 931 and the force Fd that pushes the piston 928 downward to try to close the valve opening 931 are balanced.

The coupler 924 of the pilot pressure chamber 933 is connected via hose 942 to pressure reducing and relieving valve 943 located upstream and to an air compressor 94 located further upstream relative to the said coupler. The absolute pressure of the pilot pressure chamber 933: Px kgf/cm$^2$ is set by the pressure reducing valve 943, and any positive number higher than 0 can be selected for the value of Px. If the absolute pressure of the pilot pressure chamber 933 is desired to be lower than the atmospheric pressure (absolute pressure: 1.0332 kgf/cm$^2$), however, the value of Px must be smaller than 1.0332.

The absolute pressure of the pilot pressure chamber 933: Px kgf/cm$^2$ generates a force Fx that pushes the piston 928 upwards to try to open the valve opening 931. The absolute pressure of the downstream side valve chest 932, i.e., of the second region 12: Pb kgf/cm2 generates a force Fb that pushes the valve 927 downward to try to close the valve opening 931. The diameter D a cm of the valve opening 931 and the diameter D b cm of the piston 928 of the device of an embodiment example of this invention are the same, and therefore, the valve 927 opens when $Pb<Px$ and the valve 927 closes when $Pb>Px$. Assuming that the standard value of the absolute pressure of the second region of the device of an embodiment example of this invention: Pb kgf/cm$^2$ to be approximately 0.65, the absolute pressure of the pilot pressure chamber 933: Px kgf/cm$^2$ is set at 0.65 kgf/cm$^2$ so as to maintain the absolute pressure of the second region at 0.65 kgf/cm$^2$. In other words, the valve 927 opens when $Pb<0.65$ and the valve 927 closes when $Pb>0.65$.

Actions and effects of the device of the preferred embodiment example of this invention described above are explained below.

When the vacuum pump 96 is activated, the air inside the first region 11 is sucked toward the downstream side, and the pressure in the first region 11 is reduced as required (the absolute pressure of the first region 11: Pa=0.62 kgf/cm$^2$). When the pressure of the first region 11 is thus reduced, the pressure of the air surrounding the device (the absolute pressure: Po=1.0331 kgf/cm$^2$) presses the first region 11 in the direction of the surface of an object 1 due to the pressure difference between the inside and the outside of the first region 11 (Po−Pa=0.4132 kgf/cm$^2$), such pressing force being transmitted to the surface of an object 1 via the four wheels 41, whereby the device adheres to the surface of an object 1 by suction, and moves along the surface of an object 1 when the wheels 41 are driven and rotated by a drive means, such as a geared motor (not illustrated), at this time. Further, when the pressure inside the first region 11 is kept at a certain desired pressure, the air surrounding the device presses the free end of the outer seal member 31 in the direction of the surface of an object 1 due to the pressure difference between the inside and the outside of the first region 11, thereby preventing the air from entering the first region 11 as much as possible. However, it is not necessary to prevent all the air from trying to enter the first region 11 through a minute gap between the free end of the outer seal member 31 and the surface of an object 1. Rather, allowing the air to enter the region to a certain extent will enhance the function of suction and collection of the water that flowed into the first region 11 from the second region 12 toward and at the vacuum pump.

The absolute pressure of the second region 2 during the state described above: Pb kgf/cm$^2$ will reach the same absolute pressure of the first region 11: 0.62 kgf/cm$^2$ as a little time passes because the air inside the second region 12 flows into the first region 11 through a minute gap between the free end of the inner seal member 32 and the surface of an object 1 due to the operation of the vacuum pump.

The pressure of the air or of water inside the second region 12 presses the free end of the inner seal member 32 in the direction of the surface of an object 1, thereby preventing air or water from flowing into the first region 11 as much as possible.

Because the valve 927 of the pressure control valve 92 is set so that the valve 927 is open when $Pb<0.65$ where Pb is the absolute pressure of the second region 12: Pb kgf/cm$^2$, water that is supplied when the water supply pump 95 is activated flows into the second region 12 from the opened valve 927, and the valve 927 is closed when the absolute pressure of the second region 12 rises to 0.65 kgf/cm$^2$. After the passage of a little time, the water inside the second region 12 flows into the first region 11 through a minute gap between the free end of the inner seal member 32 and the surface of an object 1, and the absolute pressure of the second region 12 decreases to less than 0.65 kgf/cm$^2$, thereby opening the valve 927 again. Subsequently, the valve 927 thus opens and closes repeatedly and maintains the absolute pressure of the second region 12 at a certain value.

The water that flowed from the second region 12 into the first region 11 is transported by suction to the cyclone 963 together with the air that entered the first region 11 through a minute gap between the free end of the outer seal member 31 and the surface of an object 1. After being separated from the air at the cyclone 963, the water is returned to the water storage tank 97 by the rotary feeder 964, and the separated air is discharged back into the atmosphere through the vacuum pump 96.

Because the absolute pressures of the first region 11 and the second region 12 of the device of an embodiment example of this invention are both lower than the absolute pressure of the atmosphere, the atmospheric pressure presses the first region 11 and the second region 12 in the direction of the surface of an object 1, whereby the first region 11 and the second region 12 adhere to the surface of an object 1 by suction. At this time, the pressing force of the atmosphere is transmitted to the surface of an object 1 via the four wheels 41, whereby the device adheres to the surface of an object 1 and moves along the surface of an object 1 when the wheels 41 are driven and rotated by a drive means, such as a geared motor (not illustrated).

The operational principle of the pressure control valve 92 will be explained below by referring to FIG. 3 and formulas.

The aggregate force that acts downwards on the valve 927 toward its closing position Ft1 kgf is:

$$Fb=Pb*Da*Da*3.14/4$$

$$Fd=Pc*Db*Db*3.14/4$$

Da=Db $$Ft1=Fb+Fd$$

$$Ft1=(Pb+Pc)*Da*Da*3.14/4$$

The aggregate force that acts upwards on the valve 927 toward its opening position Ft2 kgf is:

$$Fc=Pc*Da*Da*3.14/4$$

$$Fx=Px*Db*Db*3.14/4$$

Da=Db $$Ft2=Fc+Fx$$

$$Ft2=(Pc+Px)*Da*Da*3.14/4$$

The conditions for the valve 927 to open are:

$$Ft1<Ft2$$

$$(Pb+Pc)*Da*Da*3.14/4<(Pc+Px)*Da*Da*3.14/4$$

$$Pb+Pc<Pc+Px$$

$$Pb<Px$$

where Pb kgf/cm2 is the absolute pressure of the second region 12 and the downstream side valve chest 932, Pc kgf/cm2 is the absolute pressure of the upstream side valve chest 931 and the upstream side pressure chamber 934, Px kgf/cm2 is the absolute pressure of the pilot pressure chamber 933, Fb kgf is the force that presses downwards the valve 927 of the downward side valve chest 932, Fc kgf is the force that presses upwards the valve 927 of the upstream side valve chest 931, Fd kgf is the force that presses downwards the piston 928 at the upstream side pressure chamber 934, Fx kgf is the force that presses upwards the piston 928 at the pilot pressure chamber 933, Da cm is the effective diameter of the valve 927, Db cm is the effective diameter of the piston 928, and Da=Db.

The above formulas show that the pressure of the second region 12 can easily be adjusted to a goal pressure independent from the pressure of the upstream side valve chest 931 so long as the Px value of the absolute pressure of the pilot pressure chamber 933: Px kgf/$cm^2$ and the Pb value of the absolute pressure of the second region 12: Pb kgf/$cm^2$ that is the goal value of pressure setting are made equal.

Figure 5:
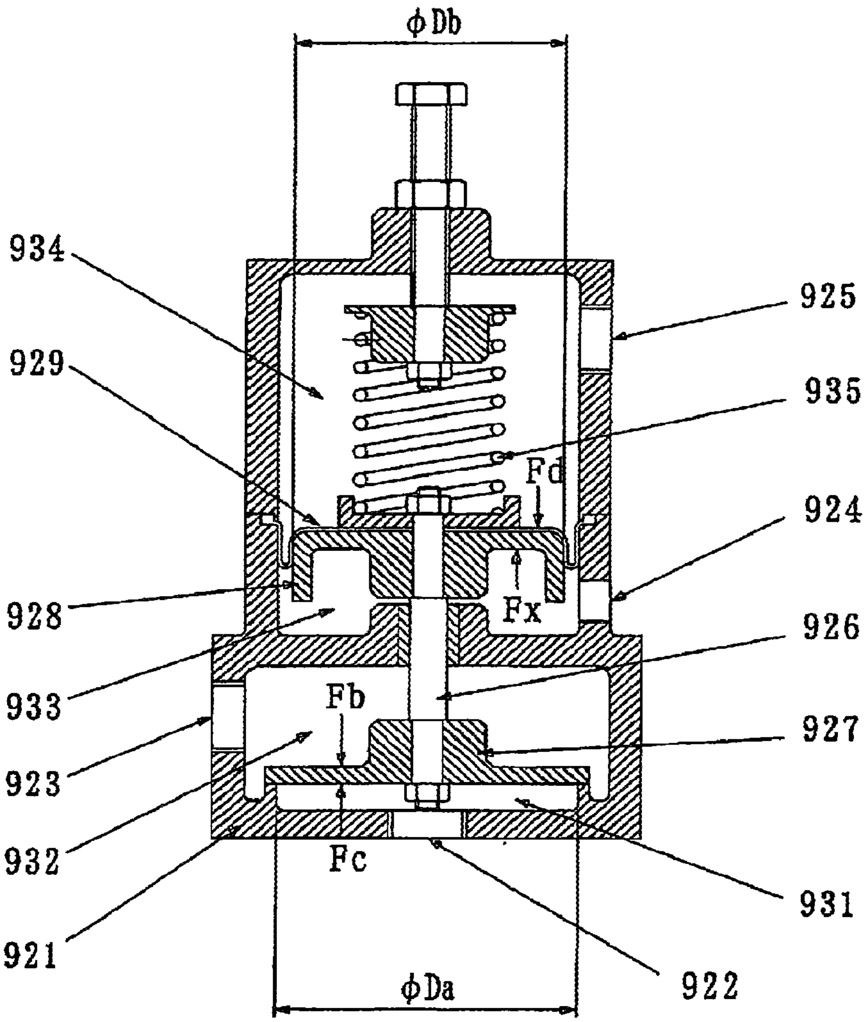
FIG. 5 shows a cross-sectional view of the second preferred embodiment example of the pressure control valve with which the device constructed according to this invention is provided.

Explained below referring to FIG. 5 is another embodiment example of the pressure control valve 92.

Figure 3:
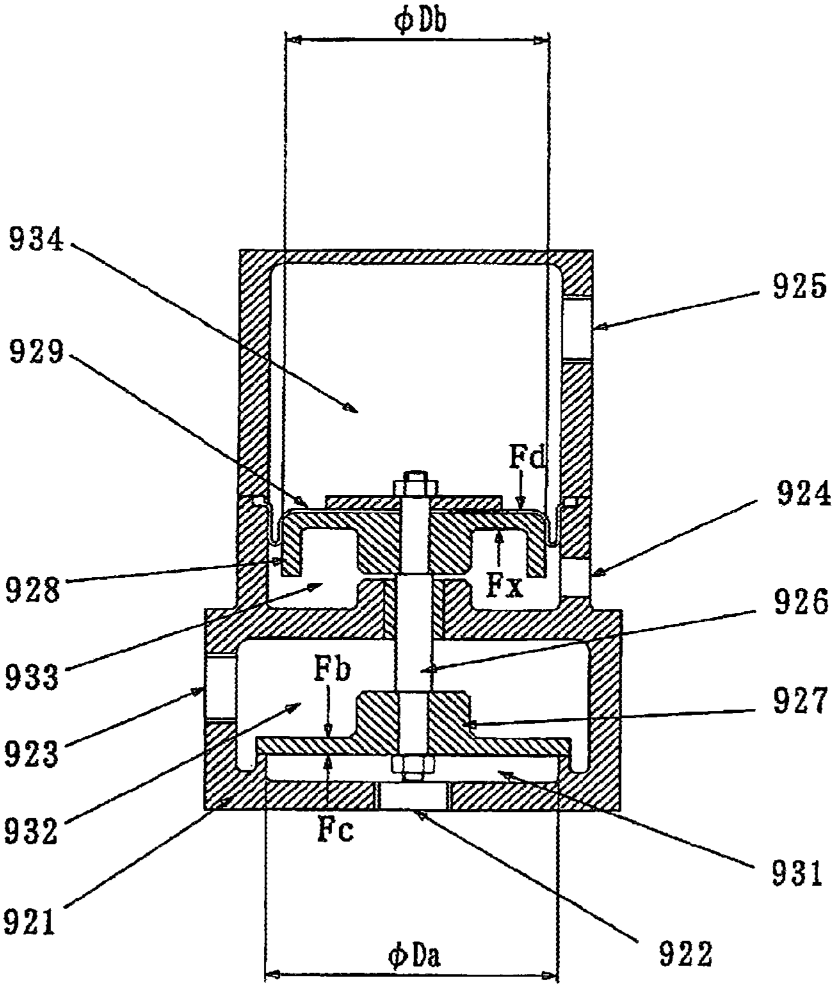
FIG. 3 shows a cross-sectional view of the first preferred embodiment example of the pressure control valve with which the device constructed according to this invention is provided.

The only differences between the pressure control valve 92 in FIG. 5 and the pressure control valve 92 in FIG. 3 are that the coupler 924 of the pilot pressure chamber 933 is open to the atmosphere and that the former has a coil spring 935 that presses the piston 928 of the upstream side pressure chamber 934 downwards.

The operational principle of the pressure control valve 92 shown in FIG. 5 will be explained below by using formulas.

The aggregate force that acts downwards on the valve 927 toward its closing position Ft1 kgf is:

$$Fb=Pb*Da*Da*3.14/4$$

$$Fd=Pc*Db*Db*3.14/4$$

Da=Db $$Ft1=Fb+Fd+Fs$$

$$Ft1=(Pb+Pc)*Da*Da*3.14/4+Fs$$

The aggregate force that acts upwards on the valve 927 toward its opening position Ft2 kgf is:

$$Fc=Pc*Da*Da*3.14/4$$

$$Fx=1.0332*Db*Db*3.14/4$$

Da=Db $$Ft2=Fc+Fx$$

$$Ft2=(Pc+1.0332)*Da*Da*3.14/4$$

The conditions for the valve 927 to open are:

$$Ft1<Ft2$$

$$(Pb+Pc)*Da*Da*3.14/4+Fs<(Pc+1.0332)*Da*Da*3.14/4$$

$$Fs<(1.0332-Pb)*Da*Da*3.14/4$$

where Pb kgf/cm2 is the absolute pressure of the second region 12 and the downstream side valve chest 932, Pc kgf/$cm^2$ is the absolute pressure of the upstream side valve chest 931 and the upstream side pressure chamber 934, the absolute pressure (the atmospheric pressure) of the pilot pressure chamber is 0.0332 kgf/$cm^2$, Fb kgf is the force that presses downwards the valve 927 of the downstream side valve chest 932, Fc kgf is the force that presses upwards the valve 927 of the upstream side valve chest 931, Fd kgf is the force that presses downwards the piston 928 at the upstream side pressure chamber 934, Fx kgf is the force that presses upwards the piston 928 at the pilot pressure chamber 933, Da cm is the effective diameter of the valve 927, Db cm is the effective diameter of the piston 928, Da=Db and Fs kgf is the force of the coil spring 935 that presses downwards the piston 928 at the upstream pressure chamber 934.

The above formulas show that the force of the coil spring 935 that presses downwards the piston 928: Fs kgf is expresses as functions of the Pb value of the absolute pressure of the second region 12: Pb kgf/$cm^2$ that is the goal value of pressure setting and the effective diameter of the valve 927: Da cm.

In other words, it is shown that that the pressure of the second region 12 can easily be adjusted to a goal pressure independent from the pressure of the upstream side valve chest 931.

In comparison to the pressure control valve 92 shown in FIG. 3, the pressure control valve 92 shown in FIG. 5 is advantageous in that it does not require pressure setting of the pilot pressure chamber 933. Either of the pressure control valves can be used with the device of this invention.

The reason that it is important to adjust the pressure of the second region 12 to a certain designated pressure using the pressure control valve 92 is explained below:

It is advantageous to maintain the pressure of the second region 12 at a lower level because it reduces the quantity of water flowing out of the second region 12 into the first region 11; The second region 12 can adhere to the surface of an object 1 if the pressure of the second region 12 is lower than the atmospheric pressure. On the other hand, the pressure of the water supply pump 95 fluctuates depending upon the length of the hose 951, and pressure loss of the hose 951 is rather great. A water supply pump with a greater pressure capacity must be selected, for that reason, for the water supply pump 95. If the pressure capacity of the water supply pump 95 is great, the diameter of the hose 951 can be made smaller. This in turn requires a pressure control valve having a pressure reduction function at the downstream side of the water supply pump 95.

The pressure control valve 92 of the device of an embodiment example of this invention has a superior characteristic of lowering the pressure of the water supplied by the water supply pump 95 to lower than the atmospheric pressure independent of the pressure capacity of the pump.

The device of an embodiment example of this invention having an ultrasonic flaw detector 91 at the second region 12 is explained below.

Flaw detection information as to whether cracks exist on welded lines on the surface of an object 1 can be obtained by emitting ultrasonic waves from the ultrasonic flaw detector 91 toward the surface of the object 1 and receiving reflective waves from the surface of the object 1. The water in the second region 12 can effectively transmit the ultrasonic waves as a contact medium.

The device of an embodiment example of this invention having an ultrasonic oscillator 91 for ultrasonic cleaning at the second region 12 is explained below.

When ultrasonic waves are emitted from the ultrasonic oscillator 91 toward the surface of an object 1, the water in the second region 12 effectively transmits such ultrasonic waves, thereby cleaning the surface of the object 1.

If the surface of an object 1 is a pavement made of a porous material for better water drainage, for example, the water in the second region 12 permeates into the voids of the pavement, wherein ultrasonic waves act on dirt and other foreign materials clogging the voids, such dirt and other foreign materials caused to be exfoliated from the surface of the voids and to float in the water, subsequently being pushed through the voids by the water, transported and reaching to the first region 11 together with the water, and sucked toward the downstream direction together with the air that entered the first region 11 through a water hose 961 for final collection.

Figure 4:
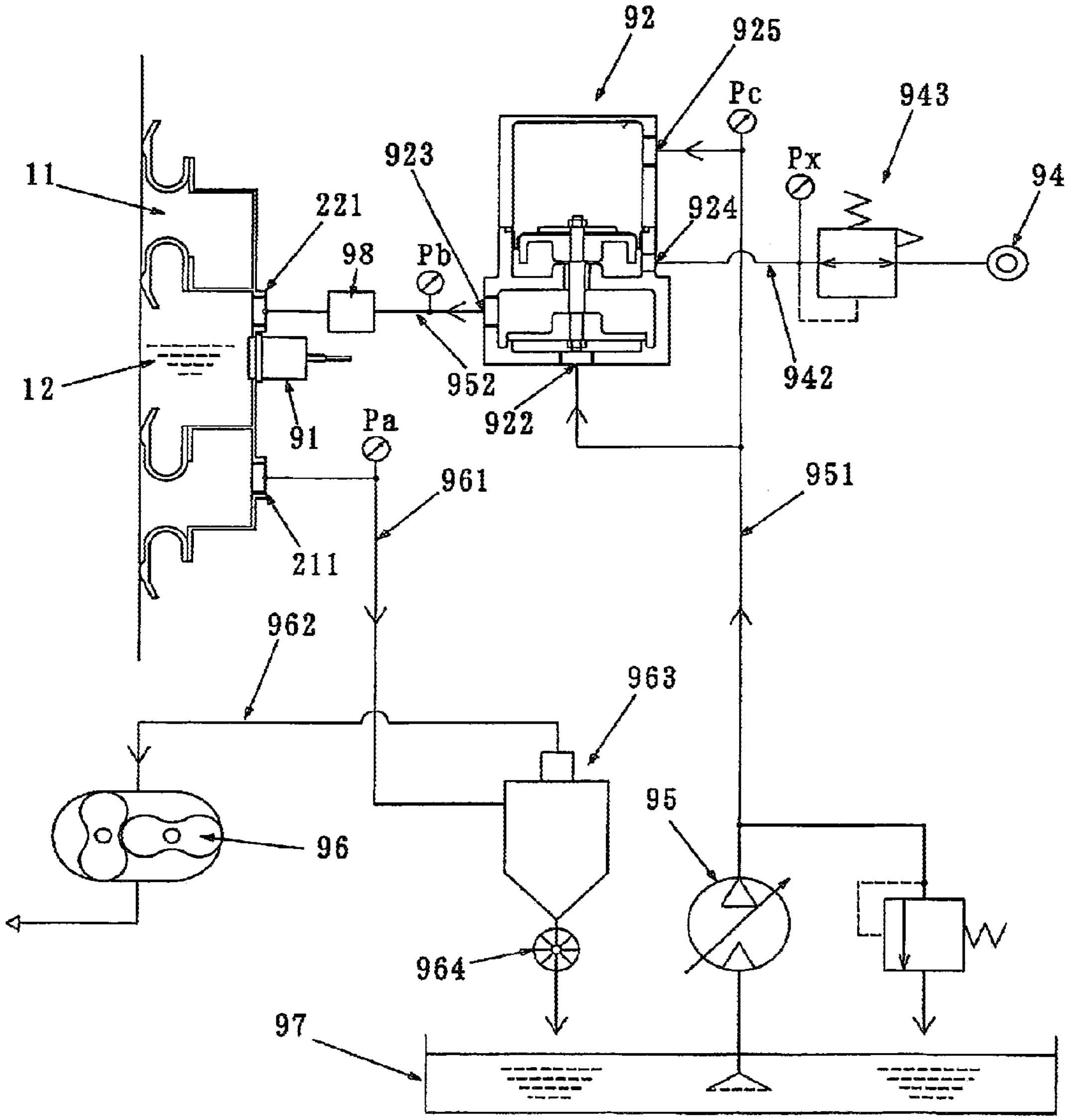
FIG. 4 shows the entire system of a preferred embodiment example of the device constructed according to this invention.
Figure 8:
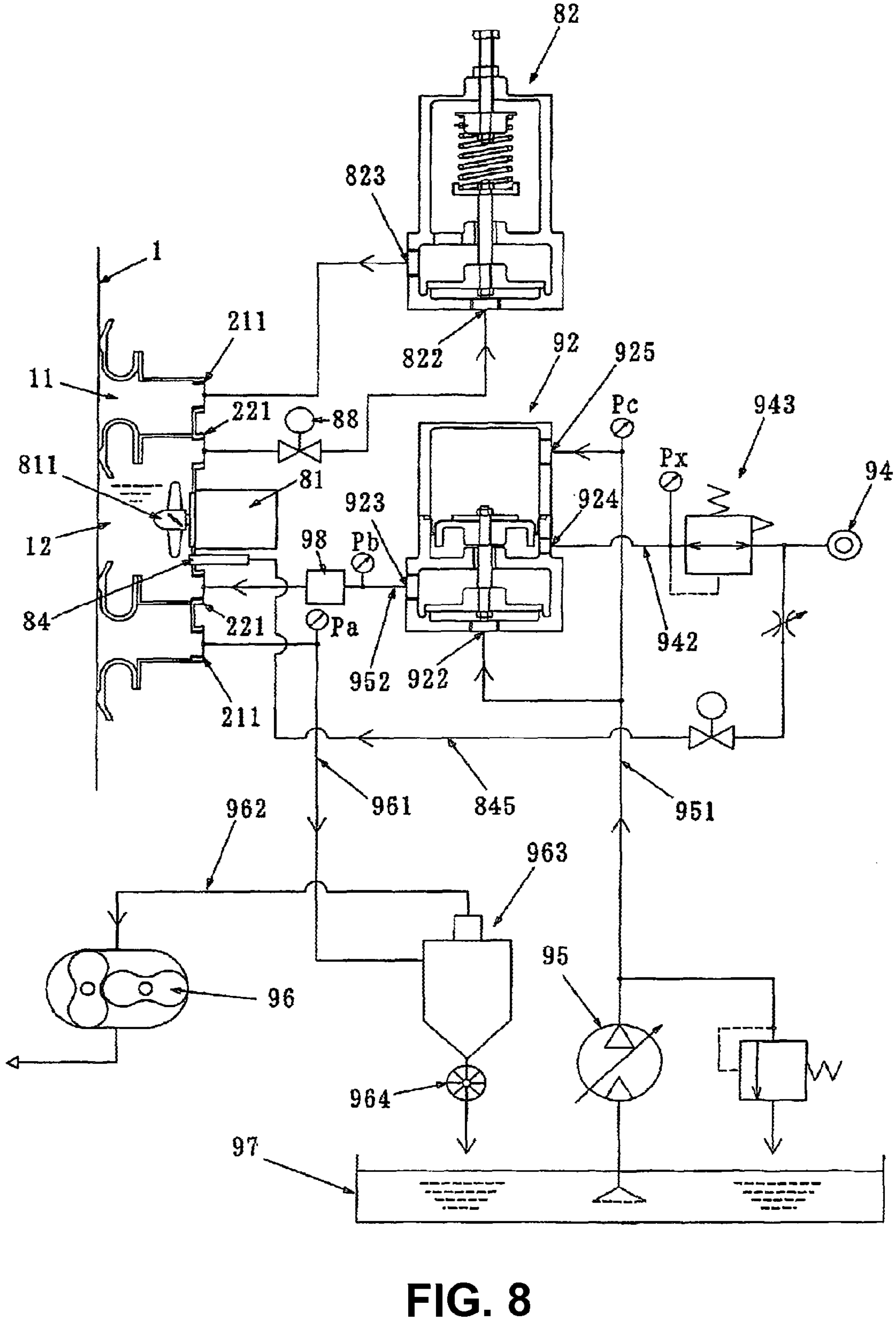
FIG. 8 shows the entire system of a preferred embodiment example of the device constructed according to this invention shown in FIG. 6.

When a cleaning operation is conducted to remove foreign materials clogging voids of the surface of a road paved with a porous material for better water drainage using the device of an embodiment example of this invention, a flowmeter 98 shown in FIG. 4 and FIG. 8 may be used to measure the quantity of water per unit time that flows from the pressure control valve 92 to the second region 12, thereby quantitatively grasping the degree of the passage drag of the voids affecting the water flow from the second region 12 to the first region 11 through the voids because the quantity of water per unit time is the same as the quantity of water that flows out of the second region 12 and into the first region 11 through such voids.

Assuming that, when water flows from the second region 12 and reaches the first region 11 through an orifice of the square measure of A square meters, the degree of the passage drag of the orifice affecting the water flow is the same as the passage drag of the voids, the following equasion holds true:

$$Q*Q=C*C*A*A*2*g*(Pb-Pa)*10332/r$$

where Q is the flow rate of water per second ($m^3/s$), C is a flow rate coefficient (approximately 0.65), g is gravitational acceleration (9.8 $m/s^2$), r is the specific gravity of water (1,000 $kgf/m^3$ at 1 atmosphere and 4 degrees C.), Pb is the absolute pressure of the second region 12 ($kgf/cm^2$), and Pa is the absolute pressure of the first region 11 ($kgf/cm^2$).

The value of A of the square measure of the orifice (A square meters) can be calculated by measuring the quantity of water per unit time Q that is supplied from the pressure control valve 92 to the second region 12, the absolute pressure Pa of the first region 11 and the absolute pressure Pb of the second region 12, and by using the equasion given above. If the flow rate of water is reduced by one half, for example, when the absolute pressure of the first region 11 and the absolute pressure of the second region 12 are constant, it can be surmised, based on the equation given above, that the passage drag increased and the flow rate of water decreased by one half as the square measure of the orifice is reduced by one half. In other words, the increase or decrease of the square measure of the orifice derived by calculations indicate the degree of the passage drag affecting water flow, and the decrease in the square measure of the orifice can be interpreted to be the increase in the passage drag of the voids affecting water flow. Further, it can be stated that the square measure of the orifice and the aggregate square measures of all the voids are equivalent to each other.

By measuring the quantity of water per unit time Q supplied to the second region 12, the absolute pressure Pa of the first region 11 and the absolute pressure Pb of the second region 12 of the device of an embodiment example of this invention that moves along the surface of an object made of a porous material and having numerous voids, the value equivalent to the aggregage volume of the voids can be derived by calculation by using the Q, Pa and Pb values.

"The quantity of water per unit time Q supplied to the second region 12" can be rephrased to "the quantity of water per unit time Q that moves from the second region 12 to the first region 11 through voids" and the sentence given above can be rephrased as follows:

"By measuring the quantity of water per unit time Q that moves from the second region 12 to the first region 11 through voids, the absolute pressure Pa of the first region 11 and the absolute pressure Pb of the second region 12 of the device of an embodiment example of this invention that moves along the surface of an object made of a porous material and having numerous voids, the value equivalent to the aggregage volume of the voids can be derived by calculation by using the Q, Pa and Pb values."

Finally, by rephrasing "the first region 11" to "Region M" and "the second region 12" to "Region N" and "the quantity of water per unit time" to "the quantity of a fluid per unit time," the above sentence can be rephrased as follows:

"By measuring the quantity of a fluid per unit time Q that moves from Region N to Region M through voids, the absolute pressure Pa of Region M and the absolute pressure Pb of Region N of the device of an embodiment example of this invention that moves along the surface of an object made of a porous material and having numerous voids, the value equivalent to the aggregage volume of the voids can be derived by calculation by using the Q, Pa and Pb values."

This invention proposes a calculation method to derive the value equivalent to the aggregate volume of voids for the device that moves along the surface of an object made of a porous material and having numerous voids. In conjunction with such calculation method, a device of an embodiment example of this invention that is not shown in FIG. 1 through FIG. 9 is proposed below:

The device that moves along the surface of an object, made of a porous material and having numerous voids, and has a stereoshaped region M having a surface M, such surface M being the boundary surface between the surface of the object and the region M, and the portion that defines the outer boundary of the region M being provided with an outer seal member, the region M being connected to a fluid suction means, and the region N being a space consisting of the fluid surrounding the region M and the entire surface of the object, is so configured that the fluid in the region N reaches the region M through the voids and is subsequently transported by suction to the suction means together with the fluid being sucked out of the region M, and such device is provided with a measurement means that measures the quantity of the fluid Q by unit time that moves from the region N to the region M through the voids, the absolute pressure Pa of the region M and the absolute pressure Pb of the Region N and calculates the value equivalent to the aggregate volume of the voids using the values of Q, Pa and Pb. The fluid in the previous description may be a liquid or a gas.

Explained below is a cleaning action of the device of an embodiment example of this invention that does not have an ultrasonic oscillator for cleaning.

If the surface of an object 1 is the surface of a road paved with a porous material for better water drainage, for example, the water in the second region 12 enters the voids of such pavement, and is subsequently transported by suction to the first region 11 through the voids. When the water flows through the voids, mud and other foreign materials scattered within the voids are pushed by the water and are transported by suction to the region 11 together with the water. In other words, the water can be effectively used as a medium for transporting the foreign materials. In comparison to the case where air is used instead of water as a medium for transporting foreign materials, foreign materials are pushed by a force approximately 800 times as strong when water is used.

The reason for the above is explained below using a formula.

Assuming that a spherical foreign object with the diameter of d m exists in the flow of a fluid, the drag of the fluid affecting the foreign object: D kgf can be captured by the following equasion:

$$D=Cd*A*v*v*r/(2*g)$$

where Cd is a drag coefficient and is 0.34 for a spherical body, A is a projected measure ($m^2$) of the spherical body in the perpendicular direction to the direction of the flow of the fluid, v is the velocity of the fluid (m/s), r is the specific gravity of the fluid ($kgf/m^3$) and g is gravitational acceleration (9.8 $m/s^2$). The specific gravity of water and of air at 1 atmosphere and at 4 degrees C. is 1,000 $kgf/m^3$ and 1.25 $kgf/m^3$, respectively.

The equation given above shows that the drag D kgf of a fluid affecting foreign objects increases in proportion to the specific gravity of the fluid r $kgf/m^3$. In comparison between water and air as the fluid, the drag of water is approximately 800 times as much as the drag of air at 1 atmosphere, 4 degrees C.

In other words, it can be concluded, based on the equation given above, that the use of water is more effective than the use of air as a means to washing foreign objects out.

For the device of an embodiment example of this invention, air is used at the boundary between the first region 11 and the atmosphere as a medium for sucking and transporting foreign objects, but water is used at the boundary between the first region 11 and the second region 12 as a medium for sucking and transporting foreign objects, thereby making a cleaning operation highly effective.

Figure 2:
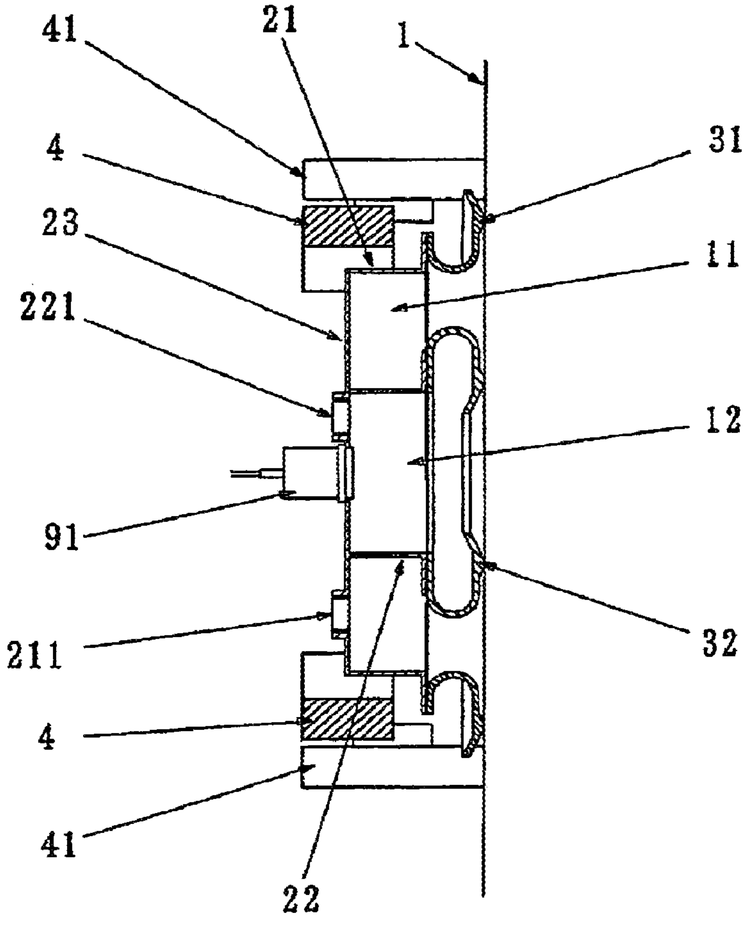
FIG. 2 shows an A-A cross-sectional view of the device shown in FIG. 1.

A device that has a rotary blade 811, a rotary blade drive motor 81, and a nozzle 84 that jets air or water that contains air to near saturation that facilitates cavitation instead of having the ultrasound flaw detector 91 or the ultrasound oscillator 91 shown in FIG. 2, is explained below as another embodiment example of this invention by referring to FIG. 6 through FIG. 8.

When the ultrasound oscillator 91 for ultrasound cleaning at the second region 12 of the device of this invention shown in FIG. 2 repeats high-speed, high-frequency oscillation, the relative movements between the surface of the ultrasound oscillator 91 and water molecules generate minute high-vacuum voids among the water molecules (called air bubbles or cavities), followed by the water molecules colliding with each other by being attracted by the high vacuum, such collisions in turn generating shock waves of approximately 1,000 atmospheres caused by collapsed air bubbles, a phenomenon commonly called cavitation. The device of an embodiment example of this invention shown in FIG. 2 cleans the surface of an object 1 by the action on the surface of the object 1 of the shock waves caused by the collapse of the air bubbles, exfoliating dirt attached to the surface of the object 1.

Figure 6:
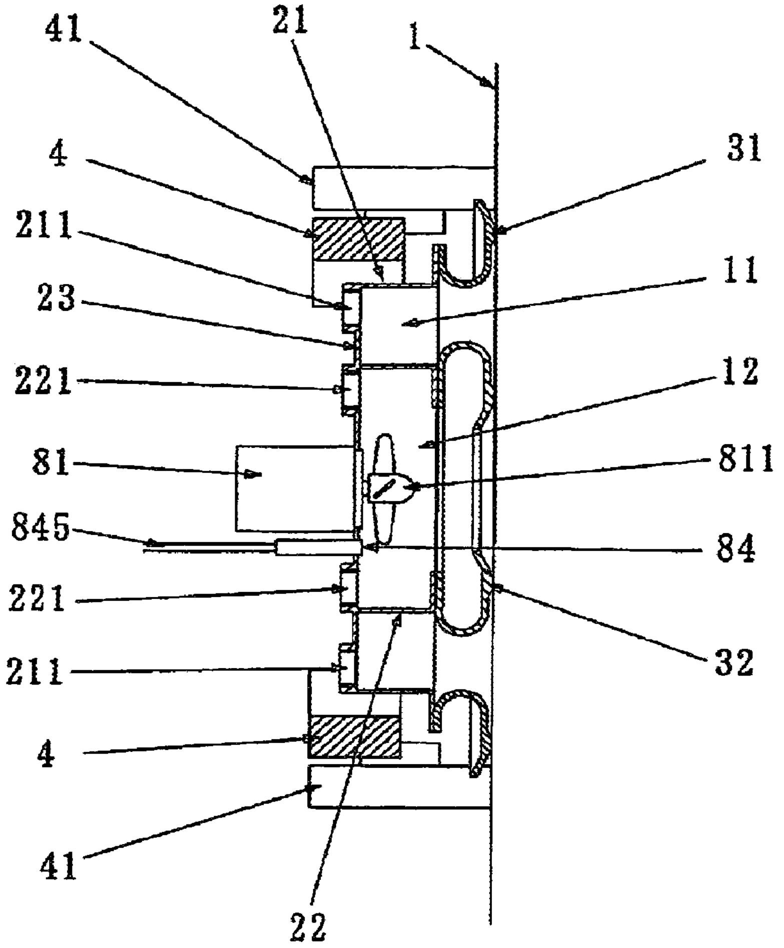
FIG. 6 shows a cross-sectional view of the device constructed according to this invention shown in FIG. 2 and having a rotary blade 811, a rotary blade driving motor 81 and a nozzle 84 that jets air or water that contains air to near saturation that facilitates cavitation, instead of an ultrasonic flaw detector 91 or an ultrasonic oscillator 91.
Figure 7:
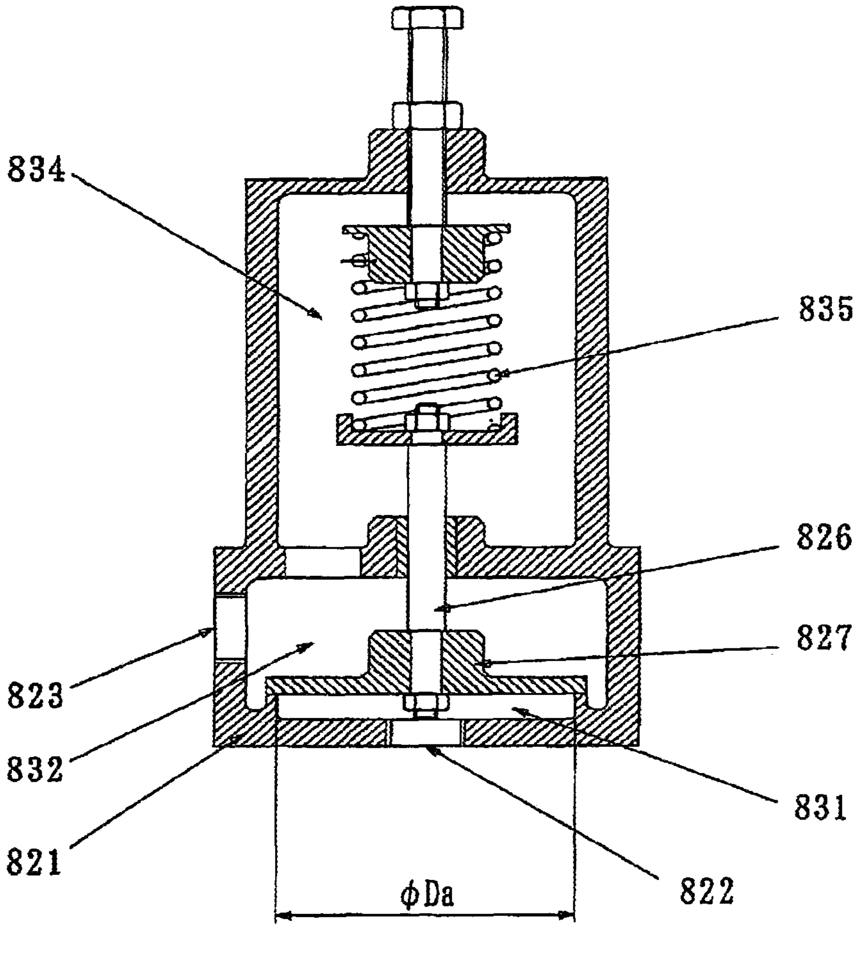
FIG. 7 shows a cross-sectional view of a preferred embodiment example of the differential pressure control valve that connects the first region 11 and the second region 12 with which the device constructed according to this invention shown in FIG. 6 is provided.

The device shown in FIG. 6 through FIG. 8 is thus another embodiment example of this invention that cleans the surface of an object 1 by the action of ultrasonic waves.

Of the device shown in the figures, a disc-shaped partition at the back side 23 has a rotary blade drive motor 81 with a rotary blade 811 that stirs water in the second region 12 to generate cavitation fixed on its drive shaft.

The disc-shaped partition at the back side 23 also has a nozzle 84 that jets air or water containing air to near saturation that facilitates cavitation into the water in the second region 12. The nozzle 84 is connected to a hose 845 that transports such air or such water.

In FIG. 8 that shows the entire system of the device of an embodiment example of this invention, the nozzle 84 jets air as the hose 845 is connected to an air compressor 94.

Of the disc-shaped partition at the back side 23, the portion in contact with the second region 12 and in a direction directly opposite of the direction of gravity has the second coupler 221.

Of the disc-shaped partition at the back side 23, the portion in contact with the first region 11 has the second coupler 211. The second coupler 211 may be located anywhere within the area that is in contact with the first region 11.

Installed between the coupler 221 and the coupler 211 is a differential pressure control valve 82.

The differential pressure control valve 82 is a widely-known valve, but will be explained below in reference to FIG. 7. The casing 821 of the differential pressure control valve 82 is roughly divided into two chambers: a valve storage chamber (both areas 831 and 832) and a valve drive chamber 834. In FIG. 7, however, the valve storage chamber and the valve drive chamber are one and the same area with the same pressure because they are connected by a hole. Inside the valve storage chamber, a disc-shaped valve 827 is descended to close a valve opening 831 by the actions of a compressed coil spring 835 and a drive rod 826. When the valve 827 closes the valve opening 831, the valve storage chamber is divided into two chests: an upstream side valve chest 831 and a downstream side valve chest 832. In the figures showing the present embodiment example, the upstream side valve chest 831 and the valve opening 831 are one and the same.

Explained below is the operation of the differential pressure control valve 87 shown in FIG. 7 using formulas.

The aggregate force that acts downwards on the valve 827 toward its closing position Ft1 kgf is:

$$Fa=Pa*Da*Da*3.14/4$$

$$Ft1=Fa+Fs$$

$$Ft1=Pa*Da*Da*3.14/4+Fs$$

The aggregate force that acts upwards on the valve 827 toward its opening position Ft2 kgf is:

$$Fb=Pb*Da*Da*3.14/4$$

$$Ft2=Fb$$

$$Ft2=Pb*Da*Da*3.14/4$$

The conditions for the valve 827 to open are:

$$Ft1<Ft2$$

$$Pa*Da*Da*3.14/4+Fs<Pb*Da*Da*3.14/4$$

$$Fs<(Pb-Pa)*Da*Da*3.14/4$$

where Pa kgf/cm$^2$ is the absolute pressure of the first region 11 and the downstream side valve chest 832, Pb kgf/cm$^2$ is the absolute pressure of the upstream side valve chest 831, Da cm is the effective diameter of the valve 827, Fa kgf is the force that presses downwards the valve 827 at the downstream side valve chest 832, Fb kgf is the force that presses upwards the valve 827 at the upstream side valve chest 831, and Fs kgf is the force that the coil spring 835 presses the valve 827 downwards.

The above formulas show that the force of the coil spring 835 that presses downwards the valve 827: Fs kgf is expresses as functions of the Pa value of the absolute pressure of the first region 11: Pa kgf/cm$^2$ that is the goal value of pressure setting, the Pb value of the absolute pressure of the second region 12: Pb kgf/cm$^2$ that is the goal value of pressure setting, and the effective diameter of the valve 827: Da cm.

In other words, it is shown that that, once the pressure of the second region is set at a certain designated goal pressure, the pressure of the first region 11 can easily be adjusted to that goal pressure. Assuming, for example, that the value of Pa of the absolute pressure of the first region 11: Pa kgf/cm$^2$ is approximately 0.62, and assuming the value of Pb of the absolute pressure of the second region: Pb kgf/cm$^2$ is approximately 0.65, the differential pressure control valve 82 can easily be preset so that the valve 827 is opened when $Pa<0.62$ and the valve 827 is closed when $Pa>0.65$. In other words, when the absolute pressure of the first region 11 attempts to fall below 0.62 kgf/cm$^2$ due to a pressure loss increase as the gap between the outer seal member 31 and the surface of an object 1 decreases, the valve 827 is opened and water moves from the second region 12 to the first region 11, and the absolute pressure of the first region 11 is maintained at 0.62 kgf/cm2.

The action of the device of an embodiment example of this invention shown in FIG. 6 through FIG. 8 is explained below.

When the rotary blade 811 rotates at a high speed in the water in the second region 12, a decrease in the pressure between the surface of the rotary blade 811 and water molecules causes minute high-vacuum voids among the water molecules (called air bubbles or cavities) to be generated, followed by the water molecules colliding with each other by being attracted by the high vacuum, such collisions in turn generating shock waves by the collapse of the air bubbles, a phenomenon commonly called cavitation. The air or the water containing air to near saturation jetted out by the nozzle 84 further facilitates the cavitation. The device of an embodiment example of this invention shown in FIG. 6 through FIG. 8 acts on and cleans the surface of an object 1 as the shock waves generated by collapsed air bubbles acts on the surface of the object 1 and exfoliates dirt stuck on the surface of the object 1.

The action of the differential pressure control valve 82 is explained below.

The second region 12 accumulates and stores air due to the air or the water containing air to near saturation jetted out of the nozzle 84.

Even if the device of an embodiment example of this invention does not have the nozzle 84, cavitation is generated when the rotary blade 811 rotates at a high speed in the water in the second region 12. In such a case, the air molecules originally mixed in water molecules become separated from water molecules due to the cavitation, resulting in a phenomenon called foaming. If air exists in the second region 12, the generation of cavitation is blocked due to the foaming phenomenon. The purpose of the differential pressure control valve 82 is to eliminate the air in the second region 12 by transportation by suction to the first region as well as controlling the pressure of the first region 11 to a certain designated pressure. The coupler 221 connected to the differential pressure control valve 82 is located at the area where air separated from water and floating up accumulates, i.e., the area located directly opposite from the direction of the action of gravity so that the air in the second region 12 is effectively eliminated by suction.

The electromagnetic valve 88 is normally opened, but is temporarily closed when the quantity of water supplied from the pressure control valve 92 to the second region 12 is measured per unit time with the flow meter 98.

Figure 9:
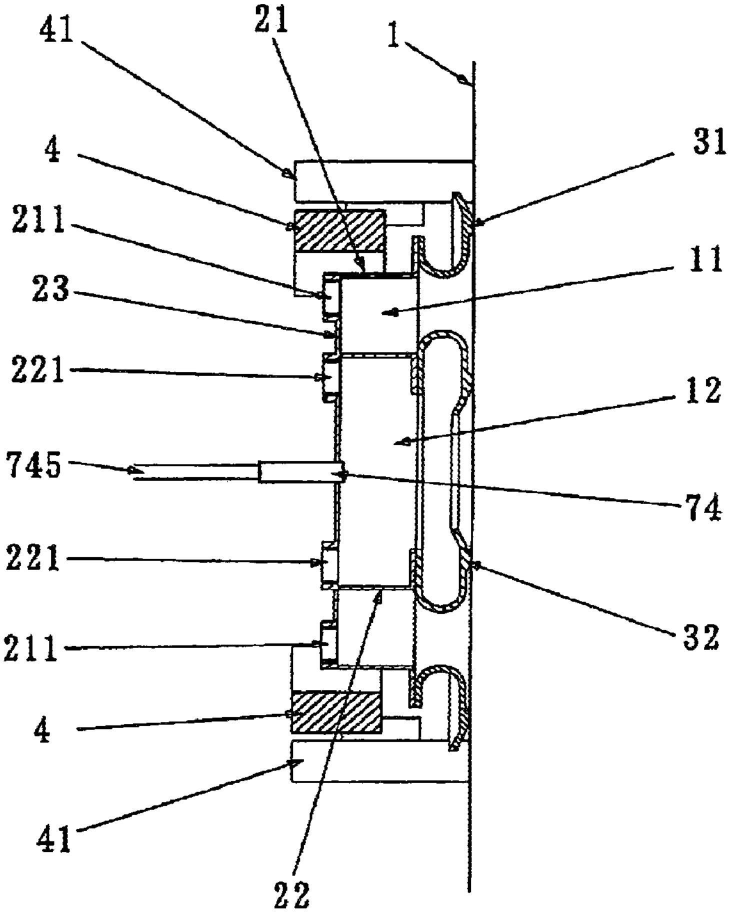
FIG. 9 shows a cross-sectional view of the device constructed according to this invention shown in FIG. 6 and having a nozzle that jets high-speed water jet with cavitation 74, instead of the rotary blade 811, the rotary blade driving motor 81 and the nozzle 84 that jets air or water that contains air to near saturation that facilitates cavitation.

FIG. 9 shows the device of an embodiment example of this invention that cleans the surface of an object by the action of ultrasonic waves, having a nozzle 74 that jets high speed water jet with cavitation instead of the rotary blade 811, the rotary blade drive motor 81 and the nozzle 84 that jets air or water containing air to near saturation for the facilitation of cavitation shown in FIG. 6.

The high speed water jet with cavitation is a high speed water jet so designed that, because air or water containing air to near saturation is supplied into high speed water jet at the upstream side of the jetting opening of the nozzle 74, when high speed water jet is jetted out from the nozzle 74, the molecules of the air thus supplied will grow to cavities with stronger shock force, i.e., cavitation will be facilitated. Dirt stuck on the surface of an object 1 is exfoliated, and the surface of an object 1 is cleaned by the shock waves acting on the surface of the object 1 due to the generation of the cavitation.

Although not illustrated, the water used for the high speed water jet may be circulated and reused by configuring the device so that the water in the second region 12 is first sucked by a high pressure pump, then air or water containing air to near saturation is supplied into the high speed water jet on the downstream side of the high pressure pump and at the upstream side of the jetting opening of the nozzle 74, and the high speed water jet is finally jetted into the water in the second region 12 with the nozzle 74.

Incidentally, also in the case of the device of the embodiment of the invention, a differential control valve 82 is similarly required as in the case of the device of the embodiment of the invention as shown in FIGS. 6 through 8.

As shown above, the device of the embodiment of the invention is explained, but as for the device of the embodiment of the invention, it is possible to conceive various embodiments, based on the scope of the claims, other than the preferred embodiments.

As is clear from the above descriptions, this invention may be applied to various applications, including ultrasonic flaw detection on and ultrasonic cleaning of the surface of an object because this invention allows the surface of an object situated in a gas to be locally covered with a region filled with a liquid, allows such region to move along the surface of the object, and further allows the liquid to be sucked and collected from the surface of the object and allows the surface of the object wetted by the liquid to be dried.

Because the pressure of the above region filled with a liquid can be reduced lower than the atmospheric pressure, the device of this invention can be adhered to and moved along the wall and the ceiling of a structure, hence automating ultrasonic flaw detection of the wall and ceiling of such structure.

Concrete effects of this invention includes the following: Of the device moving along the surface of an object while conducting ultrasonic flaw detection, the water as a contact medium is all collected, circulated and reused during such ultrasonic flaw detection operation, hence not requiring a large quantity of water, preventing rust as the surface being detected for flaws is not left in a wet condition but is dried after such ultrasonic flaw detection operation, and further preventing the ultrasonic flaw detector from being damaged because the ultrasonic flaw detector is not in direct contact with the surface being detected for flaws during such ultrasonic flaw detection operation.

Concrete effects of this invention further includes that, of the device that moves along the surface of an object while conducting ultrasonic flaw detection, the region containing water as a contact medium has the function of adhering to the surface of the object by being negatively pressurized.

Concrete effects of this invention further includes that, of the device that moves along the surface of an object while conducting ultrasonic cleaning, foreign objects clogging the voids of the surface of a porous object are successfully removed without requiring a large amount of water due to the fact that the device has a function whereby the water as a medium for transmitting ultrasound waves is caused to enter the voids of the surface of the porous object, such as a porous pavement, allowing the ultrasound waves to act on the foreign objects in the voids which are caused to be exfoliated from the surface of the voids, followed by all such foreign objects and the water being sucked and collected, and the surface of the object wetted during such operation being dried.

Because the above device also has a function of calculating values equivalent to the aggregate volumes of the voids existing on the surface of porous objects, those values equivalent to void ratios of porous pavements, for example, can be collected and stored, and distribution maps of such void ratios of porous pavements can be prepared based on such values, contributing to the maintenance and management of porous pavements.

Concrete effects of this invention further includes the fact that the device that moves along the surface of a porous object made of fiber, such as carpets, while cleaning such surface using ultrasonic waves, effectively exfoliates dirt stuck on the surface of the fiber or foreign materials fallen within the gaps of the fiber by the action of the ultrasonic waves without using a detergent which is a material that pollutes the environment, such dirt and foreign materials all sucked and collected and the surface wetted during such operation being dried.

Concrete effects of this invention further includes the fact that the device that moves along the surface of an object while conducting a cleaning operation with a liquid effectively removes foreign materials by using water as a medium for allowing the foreign materials to float after they are removed from the surface, the water being approximately 800 times as powerful as air for such purpose.

The invention claimed is:

1. A device that moves along the surface of an object situated in a gas, comprising a stereoshaped first region having an annular surface A and a stereoshaped second region situated inside the surface A and having a surface B, wherein the surface A is a boundary surface between the surface of the object and the first region and the surface B is a boundary surface between the surface of the object and the second region, the portion defining the outer boundary of the surface A is provided with an outer seal member, the portion defining the inner boundary of the surface A is provided with an inner seal material, the first region is connected to a gas suction means that sucks a gas from within the first region, the second region is connected to a liquid supply means which supplies a liquid to the second region, portion of the liquid supplied to the second region that exceeds the cubic volume of the second region, the liquid flowing downstream from the second region, reaches the first region and is subsequently transported to the suction means by riding the flow of the gas being sucked away from the first region.

2. A device that moves along the surface of an object described in claim 1, having a pressure adjustment means that adjusts the pressure of the second region to any designated pressure.

3. A device that moves along the surface of an object as described in claim 2, such pressure adjustment means comprising an upstream side valve chest connected to a liquid supply pump, a downstream side valve chest connected to the second region, a valve opening connecting the upstream side valve chest and the downstream side valve chest, a valve that opens and closes the valve opening and a valve-operating means that causes the valve to open and close, so configured that the pressure of the second region is adjusted to any designated pressure by way of the valve being opened or closed due to the pressure difference between the actual pressure of the second region and any designated pressure set as the pressure adjustment goal.

4. A device that moves along the surface of an object having the valve-operating means described in claim 3, such valve-operating means being so configured that, where Fc is the force of the liquid inside the upstream side valve chest that acts on the valve and in the direction of the valve and Fb is the force of the liquid inside the downstream side valve chest that acts on the valve and in the direction of the valve, wherein the configuration of the valve-operating means that opens and closes the valve causes a force of the same strength as Fc and in the opposite direction from Fc to act on the valve, and causes a force Fx in the opposite direction from Fb and corresponding to the goal value of pressure adjustment to act on the valve, the valve opens when Fb<Fx and the valve closes when Fb>Fx.

5. A device that moves along the surface of an object having the valve-opening means described in claim 3, such valve-operating means being so configured that, where Fc is the force of the liquid inside the upstream side valve chest that acts on the valve and in the direction of the valve and Fb is the force of the liquid inside the downstream side valve chest that acts on the valve and in the direction of the valve, wherein the configuration of the valve-operating means that opens and closes the valve causes a force of the same strength as Fc and in the opposite direction from Fc to act on the valve, causes a force Fo attributable to atmospheric pressure or a force Fo attributable to the pressure of a gas surrounding the surface of an object, the first region and the second region to act on the valve and in the opposite direction from Fb, and causes a force Fs of an elastic body, such as a spring, to act on the valve and in the same direction as Fb, the valve opens when Fb+Fs<Fo and the valve closes when Fb+Fs>Fo.

6. A device that moves along the surface of an object described in any one of claims 1 through 5 and and having a means that emits ultrasonic waves or a means that receives ultrasonic waves or both of the means at the second region.

7. A device that moves along the surface of an object described in any one of claims 1 through 5 and having a means that generates cavitation at the second region.

8. A device that moves along the surface of an object described in any one of claims 1 through 7 and having a means that measures the quantity of the liquid supplied to the second region Q by unit time, the absolute pressure Pa of the first region and the absolute pressure Pb of the second region and calculates values that are equivalent to the aggregate volume of voids existing on the surface of an object based on Q, Pa and Pb.

9. A device that moves along the surface of an object described in any one of claims 1 through 8 and having a differential pressure control valve between the first region and the second region so configured that the differential pressure control valve opens when the absolute pressure of the second region minus the absolute pressure of the first region exceeds a certain designated pressure value, allowing the fluid to flow from the second region to the first region, and the differential pressure control valve closes when the absolute pressure of the second region minus the absolute pressure of the first regions returns to the designated pressure value.

10. A device that moves along the surface of an object described in any one of claims 1 through 9 and having wheels or link belts for allowing the first region and the second region to move along the surface of the object.

11. A device that moves along the surface of an object described in any one of claims 1 through 10 and wherein the outer seal member has a self-sealing shape whereby the outer seal member is pressed against the surface of the subject by the pressure of the gas outside the outer seal member, and the inner seal member has a self-sealing shape whereby it is pressed against the surface of the object by the pressure of the liquid in the second region.

12. A device that moves along the surface of an object described claim 7 and having a means that measures the quantity of the liquid supplied to the second region Q by unit time, the absolute pressure Pa of the first region and the absolute pressure Pb of the second region and calculates values that are equivalent to the aggregate volume of voids existing on the surface of an object based on Q, Pa and Pb.

13. A device that moves along the surface of an object described in claim 7 and having a differential pressure control valve between the first region and the second region so configured that the differential pressure control valve opens when the absolute pressure of the second region minus the absolute pressure of the first region exceeds a certain designated pressure value, allowing the fluid to flow from the second region to the first region, and the differential pressure control valve closes when the absolute pressure of the second region minus the absolute pressure of the first regions returns to the designated pressure value.

14. A device that moves along the surface of an object described in claim 7 and having wheels or link belts for allowing the first region and the second region to move along the surface of the object.

15. A device that moves along the surface of an object described in claim 7 wherein the outer seal member has a self-sealing shape whereby the outer seal member is pressed against the surface of the subject by the pressure of the gas outside the outer seal member, and the inner seal member has a self-sealing shape whereby it is pressed against the surface of the object by the pressure of the liquid in the second region.

* * * * *